July 22, 1952   M. H. DE BRUIN   2,604,309
ENGINE ACCESSORY
Filed July 13, 1945   2 SHEETS—SHEET 1
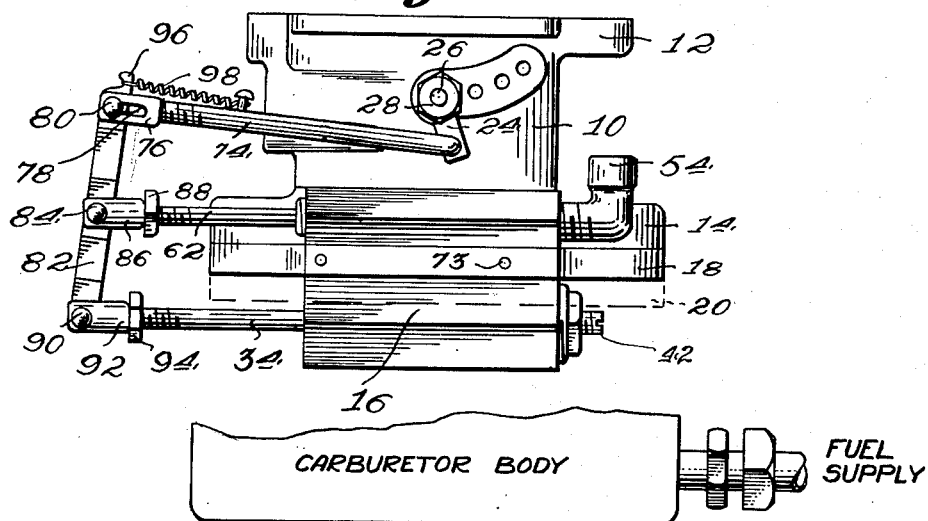
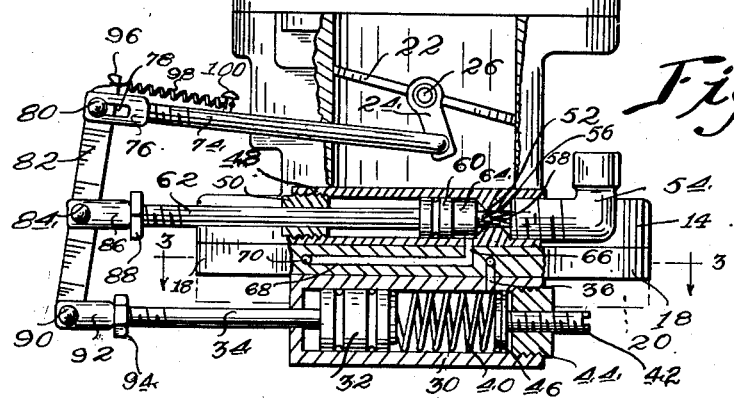
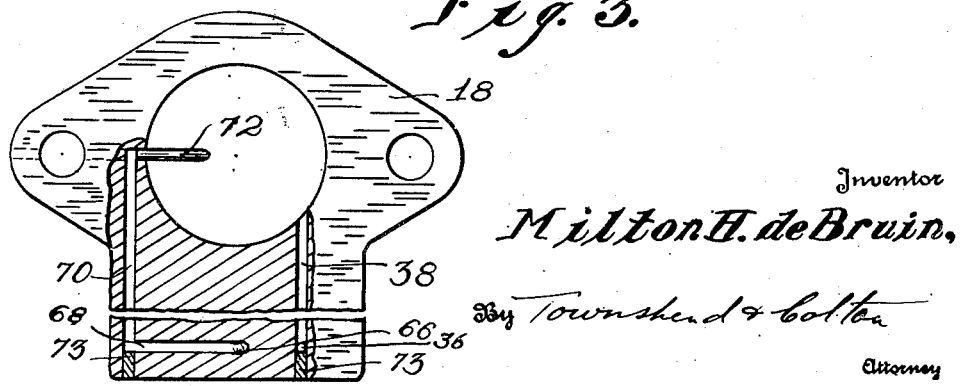
Inventor
Milton H. deBruin,
By Townshend & Colton
Attorney

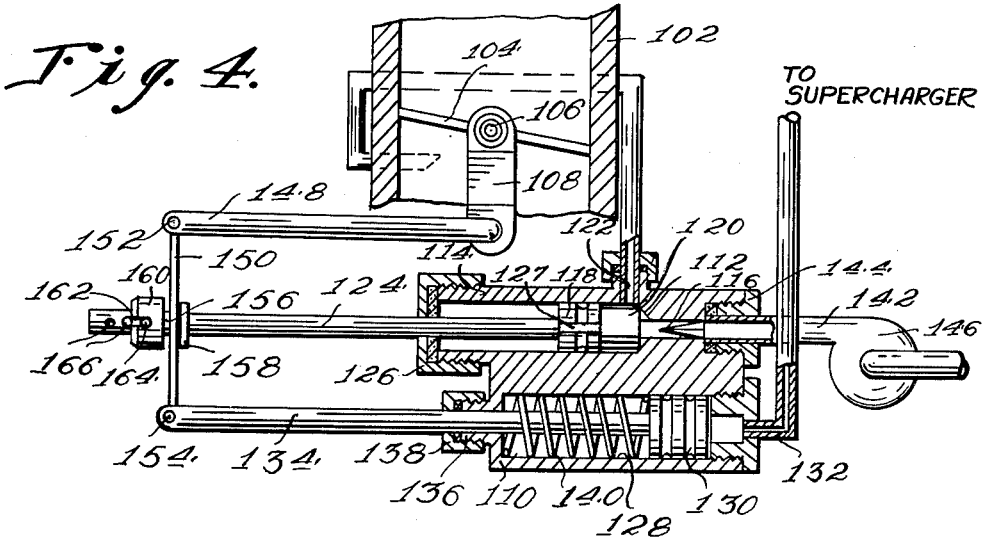
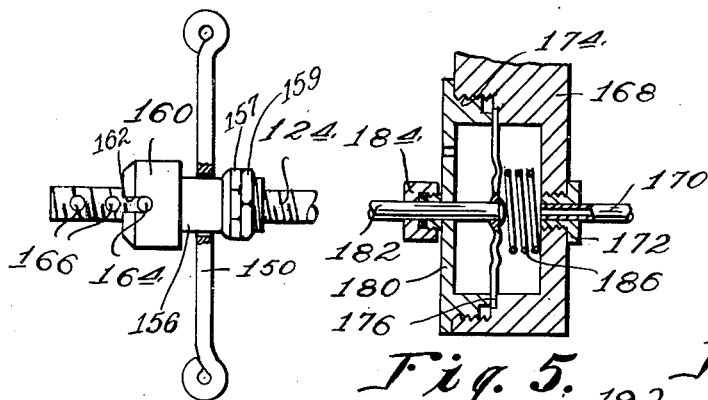
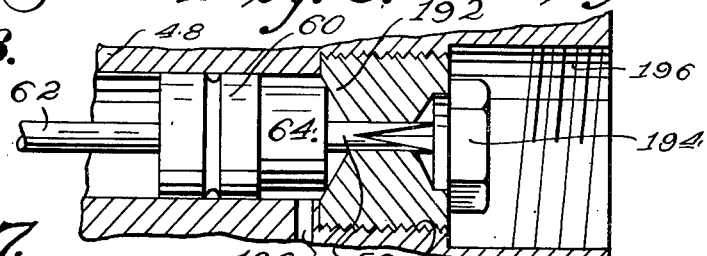
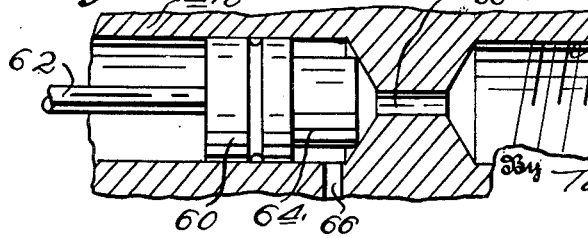

Patented July 22, 1952

2,604,309

UNITED STATES PATENT OFFICE 2,604,309

ENGINE ACCESSORY

Milton H. de Bruin, Washington, D. C.

Application July 13, 1945, Serial No. 604,829

11 Claims. (Cl. 261—18)

Motorists commonly observe that their engine power and smoothness are enhanced during damp and foggy weather. Few realize however that the improved effects are due to the injection of water into the combustion chambers with its accompanying cooling effect.

Appreciable research has been devoted to this subject, and as result, many patents have been directed to the injection of water and/or alcohol and other anti-detonating or internal coolant fluids, along with the combustible mixture entering the engine cylinders.

The advantages of such practice have been set forth ably in a recent article by A. T. Collwell, R. E. Cummings and D. E. Anderson, in the S. A. E. Journal (Transactions), June 1945, vol. 53, No. 6, pages 358 to 372. The injection apparatus proposed in this article, in common with many prior art devices, varies the quantity of anti-detonating or coolant fluid injected in response to intake manifold pressure alone. Other devices proposed in a large number of patented disclosures, rely upon throttle setting only to determine the amount of water or other anti-detonating fluid introduced.

It has now been found that to properly proportion the quantity of anti-detonating fluid for introduction into the engine along with various fuel mixtures, it is not enough to rely upon either manifold pressure or throttle setting alone. Under heavy load, whether the throttle setting is small or far advanced, detonation may be appreciable. During periods of rapid acceleration, detonation again may be evident, independent of the degree of advance of the throttle setting. Moreover, with operating conditions above peak power, optimum performance requires reduced quantities of anti-detonating fluid for increases in throttle setting. Under conditions of gradually increasing loads, it is common to experience a substantially uniform manifold pressure, in which event detonation must be compensated by increased throttle opening. Moreover, when suction windshield wipers or other accessories are operated directly from an intake manifold, their use results in a reduced manifold vacuum, which effect would actuate an injection system at improper times were manifold pressure alone the criterion. Hence, response to both throttle setting and manifold pressure jointly, is relied upon in accordance with the present invention to control the injection of coolant fluid. Preferably, the throttle setting and manifold pressure are differentially related to achieve the desired results, whereby a metering valve or the like is influenced jointly to deliver the proper quantity of fluid for all conditions of operation. Expressed differently, it may be said that the throttle setting controls the metering valve, the position of which is modified by the manifold pressure; or conversely, that the manifold pressure controls the metering valve, the position of which is modified by the throttle setting. The operating parts may be rendered adjustable to an extent necessary to adapt the device to different engines or different operating conditions of engines.

This control of coolant injection by the effects of both throttle setting and manifold pressure (superatmospheric or subatmospheric) serves to provide coolant at all times during which it may be needed, and at the same time conserve such fluid during those periods when the engine operation does not require it. Where water alone is the fluid involved, the advantage is primarily one of convenience since the need for refilling the fluid tank is kept to a minimum; but where purchased fluids, such as alcohol, are used alone or in admixture with water, the present system additionally effects a substantial saving in the cost of operation. Where such an agent as alcohol is used alone or in conjunction with water, the problem of freezing under winter conditions is obviated; otherwise the same precautions must be observed as those applied to liquid cooling systems.

The manifold pressure may be applied to a piston or diaphragm, either of which may be suitably spring loaded, for transmission of the effect to a linkage system for controlling the fluid injection. Such a linkage system is also connected to the throttle control system at some appropriate point. Since it is frequently desirable to introduce some lag in the system, provision has been made to permit varying degrees of lost motion in the linkage system whereby under certain conditions, limited changes in the controlling influences may not produce any change in setting of the metering valve.

Where applied to a subatmospheric pressure manifold, the reduced pressure tends to close the fluid valve when the opening forces are removed. Moreover, where the piston responding to manifold pressure is larger than the piston-like element carried on the valve stem, the former will prevail.

The foregoing advantages of the combined system make it possible to attain the objects of the present invention to produce simply, inexpensively and accurately, a control of internal coolant for internal combustion engines.

A more complete understanding of the present invention will follow from a detailed description of the drawings wherein:

Fig. 1 is an elevation of the device of the present invention as related to the induction system of an internal combustion engine;

Fig. 2 is an elevation of the device shown in Fig. 1, partly in section, illustrating in addition a carburetor body partially broken away, and a fuel supply line;

Fig. 3 is a section taken along line 3—3 of Fig. 2;

Fig. 4 is a somewhat diagrammatic sectional elevation of a form of the invention as applied to a supercharged system;

Fig. 5 is a sectional elevation, partially broken away, showing a modification applicable to Fig. 1;

Fig. 6 is a sectional elevation, partially broken away, showing a further modification applicable to the form of the invention shown in Fig. 1;

Fig. 7 is a sectional elevation, partially broken away, showing a further modification applicable to the form of invention shown in Fig. 1; and Fig. 8 is a detail, partially in section of a portion of the device depicted in Fig. 4.

With reference to Figs. 1 to 3 inclusive, a flanged body 10 represents the lower casting of a conventional down-draft carburetor, to the upper flange 12 of which is adapted to be connected the carburetor bowl and its accessories. To the lower flange 14 of the body, there is attached a valve body 16, the upper flange 18 of which registers with the flange 14 so as to be sandwiched between the flange 14 and the flange 20 of a suitable intake manifold shown in broken lines. The carburetor body 10 is provided with the usual pivoted butterfly valve 22, to one end of which is fastened an arm 24, the position of which with respect to the shaft 26 of the butterfly valve is rendered adjustable by means of a nut 28 threaded on the end of the shaft.

The valve body 16 comprises a cylinder 30 containing a piston 32 one end of which carries a rod 34 and the other end of which is exposed to manifold pressure through suitably arranged bores including a channel 36 extending from the interior of the cylinder to an intersecting channel 38 extending through the flange 18 to the interior of the intake line at a point on the engine side of the butterfly valve. Where the engne here under discussion normally operates at a manifold pressure lower than atmospheric it will follow that as the manifold pressure drops, the piston 32 wlil tend to move from left to right, based upon the position shown in Fig. 2 of the drawing. This tendency is opposed by a calibrated spring 40 whose degree of bias can be adjusted by means of a kerfed screw 42 penetrating a threaded closure 44 at one end of the cylinder and bearing upon the spring through a disk 46 mounted on the internal end of the screw.

The valve body is also provided with a second cylinder 48, one end of which is closed by a threaded plug 50 while near its opposite end there is provided a valve seat 52 which may assume the form of a metering jet through which an internal coolant or anti-detonating fluid may be supplied by a fitting 54 from a suitable source of fluid (not shown). A calibrated valve such as a needle valve 56 is shown as penetrating the seat in the closed position depicted in Fig. 2. The end of this valve is provided with one or more grooves 58 which may have varying depth and/or width so as to supply the internal coolant at a predetermined varying rate as the valve is retracted from its seat. The valve is maintained in its central position with respect to the cylinder by means of a piston-like element 60 to the end of which is connected a stem 62 which projects through the plug 50. Adjacent the valve, the piston-like element 60 is provided with a reduced portion 64 which, when the valve is closed, overlies without blocking, a channel 66 formed partially through the flange 18, and said channel intersecting a second channel 68 extending longitudinally of the valve body, which in turn intersects a third channel 70 formed through the flange 18 and terminates in a discharge tube or nozzle 72 which extends into the intake line at a point on the manifold side of the butterfly valve. Where the pressure in the channels 66, 68 and 70 and the discharge tube 72 in the type of engine under consideration is subatmospheric, there will be a tendency to close the valve 56 and at the same time to induce fluid from the supply system while the valve is open. It will be noted that where the channels are formed through the elements by drilling, suitable plugs 73 may be used to exclude atmospheric air.

A link 74 is pivotally related at one end to the arm 24, whereas its opposite end is screw threaded to receive a bifurcated yoke 76 having an internal longitudinal slot 78 formed therethrough for reception of a pivot pin 80 affording articulation to a beam 82. At an intermediate point the beam 82 is connected by means of a pivot pin 84 to a bifurcated yoke 86 threadedly received on the end of the valve stem 62 and maintained in any adjusted position by means of a locking nut 88. The opposite end of the beam 82 is connected by means of a pivot pin 90 to a bifurcated yoke 92 which is locked in any adjusted position by means of a nut 94, to the outer threaded end of the piston rod 34.

The upper end of the beam 82 is provided with a hook 96 or the like for reception of one end of the light spring 98, the opposite end of which is suitably connected to an intermediate point of the link 74 as by a pin or stake 100. The slot 78 in the bifurcated yoke 76 permits the idling speed of the carburetor to be adjusted without moving the internal coolant valve with respect to its seat and furthermore serves to determine the point at which the throttle movement will affect the fluid injection linkages. The spring 98 tends to maintain the fluid valve 56 closed when the engine is not operating, thus preventing the flow of internal coolant into the engine under non-operating conditions.

Since control of the injection of internal coolant is influenced jointly by the throttle movement and manifold pressure, in one case by harmonic motion and in the other by rectilinear motion, it may be said that the fluid valve is operated by the differential effects of throttle setting and manifold pressure.

To install the device of the present invention, the arm 24 is applied to the shaft 26 of the butterfly valve and secured in a desired adjusted position depending upon the portion of the harmonic motion which it is desired to impart to the beam 82. The flange 18 of the valve body will then be inserted between the carburetor flange 14 and manifold flange 20 with suitable gaskets and bolts. The end of the link 74 will then be introduced through an opening in the arm 24 and so retained by means of a cotter key or the like. With the fluid valve 56 held in closed position with respect to its seat and the piston 32 in its fully retracted position under the biasing influence of the spring 40, the slotted bifurcated yoke 76 will then be adjusted on the link 74 until the pivot pin 80 assumes an intermediate position in the slot determined by the point at which movement of the throttle is intended to actuate the beam. In order to achieve this relationship of elements, it may be necessary to adjust the effective lengths of any one or more of the linkages related to the beam 82. As will be apparent from the foregoing description, these adjustments will be made by advancing or retracting the various bifurcated yokes 76, 86 and 92 with respect to elements upon which they are threaded.

As previously stated, when the engine is not running the fluid valve 56 will remain closed under the influence of the spring 98. When the engine is started with the throttle in idling position, the vacuum in the intake line, or stated differently, the subatmospheric pressure therein will increase tending to move the piston 32 from left to right and thereby tending to urge the fluid valve 56 more firmly upon its seat. When the throttle is then opened at no load, movement of the link 74 will be transmitted to the beam 82 tending to open the fluid valve. Since no load conditions have been assumed, there will be a substantial vacuum in the intake line so that the piston 32 will have moved from left to right to counteract the effect of the throttle and thus tend to retain the fluid valve in its closed position. When load is applied to the engine however, movement of the throttle to increase the speed or assume the load will again tend to move the fluid valve from its seat and in this case since the vacuum decreases, the spring 40 will tend to overcome the effect of vacuum on the piston 32 to a greater or less degree so that the link 74 and piston rod 34 will cooperate in a tendency to raise the fluid valve and admit the internal coolant which will be fed through the interconnected channels 66, 68, 70 and 72 by the induction or aspiration effect of the manifold pressure. From these examples, the performance of the device under the various conditions of operation encountered by an engine will be apparent to those skilled in the art.

Whereas the cylinders have been shown in Fig. 2 as separately formed and attached to the flange as by brazing, they may be formed integrally with the flange if desired, or in fact, the entire mechanism may be incorporated as part of a carburetor.

With reference to Fig. 4 of the drawing, a modified form of the invention has been shown as applied to an engine supercharged ahead of the carburetor. An essential difference in this case is the application of the biasing spring to the opposite side of the manifold pressure actuated piston, from that employed in Fig. 1. The intake line 102 is provided with a butterfly valve 104 pivoted on a shaft 106 to which is attached an arm 108. A valve body 110 provided with a valve seat 112 arranged in a cylinder 114 receives a grooved valve 116 similar to the valve 56 of Fig. 1 having a piston-like element 118, serving as a guide, the piston-like element having a reduced end 120 to avoid blocking the lateral port 122 when the valve is closed. The opposite end of the piston-like element 118 is provided with a stem 124 projecting through a packed threaded cap 126. In order to tend to balance the effects of manifold pressure upon the valve in this embodiment, the piston-like element is formed with one or more grooves or slots 127.

The valve body is provided with a second cylinder 128 containing a piston 130, one end of which is exposed to superatmospheric pressure from the engine supercharger, connected through a tube 132. The opposite end of the piston carries a rod 134 passing through a threaded boss 136 which may receive a packed cap 138. Interposed between the rod end of the piston and the base of the cylinder, there is provided a calibrated spring 140 normally biasing the piston towards the right, as shown in the drawing, in opposition to the supercharger pressure. The internal coolant in this case is supplied to the cylinder 114 through a conduit 142 fitted thereto by a coupling 144 and may be supplied by a rotary pump or the like 146 inserted in the fluid line between a suitable source of supply, not shown, and the valve 116. To assure proper supply of the internal coolant, the pressure applied by the pump 146 will exceed the maximum pressure attained in the intake line 102 as result of the supercharging effect.

The linkages in this case are similar to those described with reference to Fig. 1, there being a link 148 interconnecting the arm 108 with a beam 150 through a pivot pin 152, the opposite end of the beam being connected with the piston rod 134 through a pivot pin 154. An intermediate portion of the beam 150 is perforated to receive a loosely fitting sleeve 156 carrying a flange 158 at one end for articulating the valve stem 124 with the beam. As shown in Fig. 8, the sleeve is internally threaded to adjustably receive the end of the stem 124, and externally threaded to receive a removable flange 157 and lock nut 159. The opposite end of the sleeve is provided with a flange 160, one end of which is provided with an open slot 162 for reception of a cotter pin 164 or the like, to hold it in non-rotatable relationship with respect to the stem 124 while permitting some axial movement. The end of the stem 124 is provided with a plurality of spaced cotter pin openings 166 for selective registration with the slot 162 in order to permit adjustment of the sleeve with respect to the stem 124. These parts are assembled by placing the lock nut 159 and flange 157 on the stem 124, projecting the sleeve 156 through the perforation in the beam 150, then threading the stem into the sleeve and the flange and lock nut upon it.

With the throttle at idling position and the piston 130 exposed to supercharged pressure under this condition, the sleeve 156 will be adjusted to set the internal coolant valve 116 to its proper position. Where the device is constructed for a particular engine and carburetor, many of the adjustments provided in Fig. 1 of the drawing may be omitted.

Where it is desired to employ a diaphragm to respond to manifold pressure in lieu of a piston as in Fig. 1, the cylinder 30 may be replaced by a housing 168 as shown in Fig. 5, having communication with manifold pressure through a tube 170 coupled to the housing by a fitting 172. The opposite end of the housing is provided with a threaded counterbore 174 defining a shoulder 176, for reception of a diaphragm 178 retained by a threaded cap 180. The cap is perforated for passage of a rod 182 which may be packed by a nut 184. The packing need not be fluid tight however, since the rod end of the diaphragm should in some suitable way be vented to atmosphere. One end of the rod may be riveted or otherwise fastened to the diaphragm, while the opposite end is pivoted to a beam of the type described with reference to Fig. 1. A suitable spring 186, interposed between the diaphragm and housing wall may be used to furnish the desired bias to oppose the effects of manifold pressure.

Fig. 6 depicts an enlarged modified form of the internal coolant valve of Fig. 1. As in the case of Fig. 1, the cylinder 48 receives a valve 56 having a divergent groove or grooves of varying width and depth, guided by a piston-like element 60 having a reduced end 64 which overlies the port 66 when the valve is closed. A piston rod or valve stem 62 projects from the cylinder for articulation with its actuating beam (not shown). In this case the cylinder is provided with a threaded counterbore 190 for reception of a threaded jet-like valve seat 192 having tapered approaches and terminating in a polygonal head 194 for reception of a tool for insertion and removal. The supply end of the cylinder is provided with internal threads 196 to receive a fitting for the introduction of internal coolant or anti-detonating fluid.

The modification of the valve arrangement applicable to Fig. 1, shown in Fig. 7, is inteded for an engine of the heavy duty type where the valve assumes only two positions in operation, namely, fully opened and fully closed. The calibrated jet 198 is shown as integral with the cylinder, but it may be detachable in the manner described with reference to Fig. 6. The reduced end 64 on the piston-like element 60 serves in this case as the valve, and is shown in the drawing as seated in its closed position. By properly adjusting the various yokes on a member like beam 82 of Fig. 1, the valve of Fig. 7 may be operated with a rapid movement when engine conditions are attained which call for internal cooling or a cessation of such cooling.

Whereas the foregoing examples are sufficiently typical to illustrate the invention to those skilled in the art, they are by no means exhaustive of the possible applications of the invention to the internal cooling of internal combustion engines by the combined effects of throttle movement and manifold pressure. Accordingly, the scope of the invention is not to be restricted to these examples beyond the scope of the appended claims.

I claim:

1. Internal coolant apparatus, for an internal combustion engine having a source of aqueous coolant fluid, a fuel supply, a throttle and an induction system, comprising means for conducting a coolant fluid from said source to said engine, a valve for regulating the flow of coolant in said conducting means, an actuator responsive to induction system pressure and independent of throttle setting connected with said valve, and an actuator responsive to throttle setting and independent of induction system pressure connected with said valve, whereby coolant flow is regulated by said valve automatically as a function of engine throttle setting and load.

2. Internal coolant apparatus, for an internal combustion engine having a source of aqueous coolant fluid, a fuel supply, a throttle and an induction system, comprising means for conducting a coolant fluid from said source to said engine, a valve for regulating the flow of coolant in said conducting means, adjusting means for varying the setting of said valve, an actuator responsive to induction system pressure and independent of throttle setting connected with said valve, and an actuator responsive to throttle setting and independent of induction system pressure connected with said control means, whereby coolant flow is regulated by said valve automatically as a function of engine throttle setting and load.

3. Internal coolant apparatus, for an internal combustion engine having a source of aqueous coolant fluid, a fuel supply, a throttle and an induction system, comprising means for conducting a coolant fluid from said source to said engine, a valve for regulating the flow of coolant in said conducting means, an actuator responsive to induction system pressure and independent of throttle setting connected with said valve, adjusting means for varying the setting of said actuator, and an actuator responsive to throttle setting and independent of induction system pressure connected with said valve, whereby coolant flow is regulated by said valve automatically as a function of engine throttle setting and load.

4. Internal coolant apparatus, for an internal combustion engine having a source of aqueous coolant fluid, a fuel supply, a throttle and an induction system, comprising means for conducting a coolant fluid from said source to said engine, a valve for regulating the flow of coolant in said conducting means, an actuator responsive to induction system pressure and independent of throttle setting connected with said valve, an actuator responsive to throttle setting and independent of induction system pressure connected with said valve, whereby coolant flow is regulated by said valve automatically as a function of engine throttle setting and load, and adjusting means for varying the setting of the second said actuator.

5. Internal coolant apparatus, for an internal combustion engine having a source of aqueous coolant fluid, a fuel supply, a throttle and an induction system, comprising means for conducting a coolant fluid from said source to said engine, a valve for regulating the flow of coolant in said conducting means, an actuator responsive to induction system pressure and independent of throttle setting connected with said valve, resilient means opposing movement of said actuator in one direction, and an actuator responsive to throttle setting and independent of induction system pressure connected with said valve, whereby coolant flow is regulated by said valve automatically as a function of engine throttle setting and load.

6. Internal coolant apparatus, for an internal combustion engine having a source of aqueous coolant fluid, a fuel supply, a throttle and an induction system, comprising means for conducting a coolant fluid from said source to said engine, a valve for regulating the flow of coolant in said conducting means, an actuator responsive to induction system pressure and independent of throttle setting connected with said valve, a spring biasing said actuator, adjusting means for said spring, and an actuator responsive to throttle setting and independent of induction system pressure connected with said valve, whereby coolant flow is regulated by said valve automatically as a function of engine throttle setting and load.

7. Internal coolant apparatus, for an internal combustion engine having a source of aqueous coolant fluid, a fuel supply, a throttle and an induction system, comprising means for conducting a coolant fluid from said source to said engine, control means for regulating the flow of coolant in said conducting means, an actuator responsive to induction system pressure and independent of throttle setting connected with said control means, an actuator responsive to throttle setting and independent of induction system pressure connected with said control means, and a floating link pivotally connecting said actuators with said control means, whereby coolant flow is regulated automatically as a function of engine throttle setting and load.

8. Internal coolant apparatus, for an internal combustion engine having a source of aqueous coolant fluid, a fuel supply, a throttle and an induction system, comprising means for conducting a coolant fluid from said source to said engine, control means for regulating the flow of coolant in said conducting means, a link adjustably carried by said control means, an actuator responsive to induction system pressure and independent of throttle setting connected with said link, and an actuator responsive to throttle setting and independent of induction system pressure connected with said link, whereby coolant flow is regulated automatically as a function of engine throttle setting and load.

9. Internal coolant apparatus, for an internal combustion engine having a source of aqueous coolant fluid, a fuel supply, a throttle and an induction system, comprising means for conducting a coolant fluid from said source to said engine, a valve for regulating the flow of coolant in said conducting means, an actuator including a piston responsive to induction system pressure and independent of throttle setting connected with said valve, and an actuator responsive to throttle setting and independent of induction system pressure connected with said valve, whereby coolant flow is regulated by said valve automatically as a function of engine throttle setting and load.

10. Internal coolant apparatus, for an internal combustion supercharged engine having a source of aqueous coolant fluid, a fuel supply, a throttle and an induction system, comprising means for conducting a coolant fluid from said source to said engine, control means for regulating the flow of coolant in said conducting means, an actuator responsive to induction system superatmospheric pressure and independent of throttle setting connected with said control means, and an actuator responsive to throttle setting and independent of induction system pressure connected with said control means, whereby coolant flow is regulated automatically as a function of engine throttle setting and load.

11. Internal coolant apparatus, for an internal combustion engine having a source of aqueous coolant fluid, a fuel supply, a throttle and an induction system, comprising means for conducting a coolant fluid from said source to said engine, a valve for regulating the flow of coolant in said conducting means, an actuator responsive to induction system pressure and independent of throttle setting connected with said valve, an actuator responsive to throttle setting and independent of induction system pressure connected with said valve, whereby coolant flow is regulated by said valve automatically as a function of engine throttle setting and load, and means whereby throttle idling adjustment can be effected without disturbing the position of the second said actuator.

MILTON H. DE BRUIN.

REFERENCES CITED

The following references are of record in the file of this patent:

UNITED STATES PATENTS

| Number | Name | Date |
|---|---|---|
| 1,564,039 | Whitehorn | Dec. 1, 1925 |
| 1,566,382 | Dion | Dec. 22, 1925 |
| 1,802,321 | Mabee et al. | Apr. 21, 1931 |
| 2,002,483 | Kimball | May 21, 1935 |
| 2,031,527 | Dodson | Feb. 18, 1936 |
| 2,103,368 | Hoof | Dec. 28, 1937 |
| 2,135,431 | Kimball | Nov. 1, 1938 |
| 2,142,979 | Hans | Jan. 3, 1939 |
| 2,319,773 | Ericson | May 18, 1943 |